United States Patent
Coolidge et al.

(10) Patent No.: US 10,590,962 B2
(45) Date of Patent: Mar. 17, 2020

(54) DIRECTIONAL CONTROL VALVE

(71) Applicant: Parker-Hannifin Corporation, Cleveland, OH (US)

(72) Inventors: Gregory Thomas Coolidge, Elyria, OH (US); Brian Slattery, Hicksville, OH (US); Kurt Boey, Columbia Station, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 260 days.

(21) Appl. No.: 15/594,772

(22) Filed: May 15, 2017

(65) Prior Publication Data

US 2017/0328380 A1   Nov. 16, 2017

Related U.S. Application Data

(60) Provisional application No. 62/337,117, filed on May 16, 2016.

(51) Int. Cl.
*F15B 13/04* (2006.01)
*F15B 11/05* (2006.01)
(Continued)

(52) U.S. Cl.
CPC .......... *F15B 11/055* (2013.01); *F16K 31/042* (2013.01); *F16K 31/1223* (2013.01);
(Continued)

(58) Field of Classification Search
CPC . F15B 11/055; F15B 11/05; F15B 2211/5059; F15B 2211/50581; F15B 2211/50572; F15B 2211/50563; F15B 2211/505; F15B 2211/50; F15B 13/0417; F15B 13/0817; F15B 11/0445; F15B 2211/575; F15B 2211/528; F15B 2211/30535; F16K 31/04; F16K 31/042;
(Continued)

(56) References Cited

U.S. PATENT DOCUMENTS 2,518,782 A * 8/1950 Hipp ...................... B23D 25/02
60/429
3,500,721 A   7/1968 Allen
(Continued)

*Primary Examiner* — Craig J Price
(74) *Attorney, Agent, or Firm* — McDonnell Boehnen Hulbert & Berghoff LLP

(57) ABSTRACT

An example valve section includes: a valve body configured to be fluidly coupled to the source and the actuator; a spool movable in the valve body intermediate the source and the actuator; a pressure compensator valve disposed upstream from the spool and configured to regulate flow received from the source, where the valve body defines (i) a first passage disposed upstream from the spool and configured to fluidly couple the pressure compensator valve to the spool, and (ii) a second passage disposed downstream from the spool and configured to fluidly couple the spool to the actuator; and a counterbalance valve disposed in the second passage downstream from the spool, where the counterbalance valve is opened to permit flow therethrough from the actuator to the spool in response to a pilot pressure derived from the first passage when the spool is shifted from a neutral position.

20 Claims, 9 Drawing Sheets

(51) Int. Cl.
  *F16K 31/04*   (2006.01)
  *F16K 31/122*  (2006.01)
  *F16K 11/10*   (2006.01)
  *F16K 11/22*   (2006.01)
  *F16K 11/16*   (2006.01)
  *F16K 31/12*   (2006.01)

(52) U.S. Cl.
  CPC ............... *F15B 11/05* (2013.01); *F16K 11/10* (2013.01); *F16K 11/165* (2013.01); *F16K 11/22* (2013.01); *F16K 31/04* (2013.01); *F16K 31/12* (2013.01)

(58) Field of Classification Search
  CPC .... F16K 31/1223; F16K 11/10; F16K 11/165; F16K 11/22; F16K 11/0716; Y10T 137/87193; Y10T 137/87209; Y10T 137/87217; Y10T 137/87225; Y10T 137/86606; Y10T 137/86622
  USPC .... 137/596.14, 596.15, 596.17, 596.18, 625, 137/63, 625.65
  See application file for complete search history.

(56) References Cited

U.S. PATENT DOCUMENTS

| | | | |
|---|---|---|---|
| 3,929,159 A * | 12/1975 | McAvoy | F15B 13/01 137/596.18 |
| 4,782,859 A * | 11/1988 | Constantinian | F15B 13/04 137/596.2 |
| 4,958,553 A * | 9/1990 | Ueno | F15B 13/01 137/596.15 |
| 5,259,293 A | 11/1993 | Brunner | |
| 5,307,631 A | 5/1994 | Tatsumi et al. | |
| 5,632,306 A * | 5/1997 | Taka | F15B 13/0402 137/596.16 |
| 5,950,429 A | 9/1999 | Hamkins | |
| 6,389,809 B1 | 5/2002 | Niidome et al. | |
| 6,439,257 B1 * | 8/2002 | Bruck | G05D 16/02 137/102 |
| 6,718,763 B2 * | 4/2004 | Maruta | F15B 11/0423 60/456 |
| 7,028,710 B2 * | 4/2006 | Joergensen | F15B 11/003 137/596.2 |
| 7,249,554 B2 | 7/2007 | Loedige et al. | |
| 8,020,485 B2 | 9/2011 | Jessen et al. | |
| 8,479,768 B2 | 7/2013 | Kunz et al. | |
| 8,516,944 B2 | 8/2013 | Desbois-Renaudin | |
| 8,757,208 B2 | 6/2014 | Dornbach et al. | |
| 8,910,659 B2 * | 12/2014 | Rub | F15B 13/015 137/596.14 |
| 2013/0233409 A1 * | 9/2013 | Grawunde | F16K 17/065 137/106 |
| 2013/0255809 A1 | 10/2013 | Bruck et al. | |
| 2015/0101676 A1 | 4/2015 | Knapper | |
| 2017/0307096 A1 * | 10/2017 | Janecke | F16K 11/10 |
| 2019/0219073 A1 * | 7/2019 | Jadhav | F15B 13/026 |

* cited by examiner

DIRECTIONAL CONTROL VALVE

CROSS REFERENCE TO RELATED APPLICATION

The present application claims priority to U.S. Provisional patent application Ser. No. 62/337,117, filed on May 16, 2016, and entitled "Directional Control Valve," which is herein incorporated by reference as if fully set forth in this description.

BACKGROUND

Hydraulic machinery commonly includes one or more main flow control valves, which may include directional control valves. A main flow control valve is a fluid valve that is operated directly or indirectly by an external input command.

Each main flow control valve may include a main flow control spool that is operated in response to the input command to control fluid flow and pressure to one or more associated hydraulic fluid receiving devices of the machinery. The hydraulic fluid receiving devices may include one or more hydraulic storage devices such as tanks or accumulators, hydraulic linear or rotary actuators, other hydraulic valves or subsystems, and/or any other devices that receive hydraulic fluid.

In examples, the machinery may include a plurality of main flow control valves for supplying and/or operating different hydraulic fluid receiving devices in a hydraulic system of the machinery. A main flow control valve and its associated controls (for example, an associated pressure compensator valve) may be incorporated into a valve housing, and each such valve assembly is referred to as a worksection. Worksections of the same or different configuration may be combined, for example in a side by side arrangement. A worksection combined with other sections (for example, other worksections, an inlet section, and an outlet section) may be referred to as an assembly of valve sections).

A worksection operates by controlling the cross-sectional area of a main flow control valve variable area orifice. In examples, the main control valve variable orifice is located in a fluid flow path extending between an inlet passage and an outlet passage, or workport. The inlet passage may be connected directly or indirectly to a source of fluid flow and pressure, and the outlet passage may be connected directly or indirectly to one or more of the fluid receiving devices. The flow through a given main valve orifice area is dependent upon the pressure drop across the orifice.

A pressure compensated worksection is a worksection that includes a pressure compensator valve arranged to maintain a substantially predetermined pressure drop across the main control valve variable orifice under normal operating flow conditions independently of the inlet or outlet pressure. By maintaining this substantially constant pressure drop across the orifice, a constant and repeatable flow rate through the orifice is achieved for any orifice area that is selected by the input command. The pressure drop may be controlled in part by a pressure compensator spool and by the force of a biasing device, such as a spring, acting directly or indirectly against the spool. Pressure compensated worksections such as those described above may, for example, be a pre-compensated working section including a pressure compensator valve located prior to (or upstream of) the main valve variable orifice.

Worksections may also include load-sense passages. The load-sense passages may be operably connected to provide (i.e., transmit) a pressure feedback signal from an outlet passage, which indicates the fluid pressure required by the fluid flow receiving device controlled by the valve. The load-sense passage may be operably connected to a load sensing variable displacement hydraulic pump or other load sensing source of pressure and flow (i.e. load sensing bypass compensator or a load sensing priority flow divider with controlled flow to the pressure compensated valve) to provide a feedback signal to the source. Further, an outlet passage's pressure feedback signal may be connected to the compensator spool of the associated working section. The compensator valve thus maintains the predetermined pressure drop by sensing the downstream (or outlet passage) and upstream pressures across the variable orifice which act on the pressure compensator spool biasing force end and opposite spool end, respectively.

Operation of a hydraulic system of mobile working devices of this type may involve lowering of a large negative or pulling load in a controlled manner. In examples, pilot-operated counterbalance or over-center valves could be used on the return side of the hydraulic fluid receiving devices for lowering a large negative load in a controlled manner. The counterbalance valves generate a preload or back-pressure in the return line that acts against the main drive pressure so as to maintain a positive load, which therefore remains controllable. In examples, pressure from the pump may be lost while operating a hydraulic cylinder even though flow continues. If a speed of a piston of the cylinder increases, pressure on one side of the cylinder (e.g., rod side) may drop and the counterbalance valve may then act to restrict the flow to controllably lower the load.

When the directional control valve is operating in a load-lowering mode, the pilot-operated counterbalance valve is opened by a pressurized pilot line. To protect both directions of motion of a fluid receiving device against a negative load, a counterbalance valve may be assigned to each of the ports of the fluid receiving device. Each counterbalance valve assigned to a particular port may then be controlled open via cross-over by the pressure present at the other port. In other words, a respective pressurized pilot line that, when pressurized, opens a counterbalance valve is connected to a supply line connected to the other port.

However, in examples, complex production engineering measures are required to access or tap into the cross-over pressure lines, which are required to open the counterbalance valves. Such complexity increases manufacturing costs of the valve assembly that includes the counterbalance valves.

Further, in examples, directional control valves having counterbalance valves assigned to each work port may include a shuttle valve or similar device that compares workport pressures and sends the higher load-sense signal to the pump. For example, such operation of the shuttle valve may help in cases where an outlet pressure from a hydraulic cylinder is higher than an inlet pressure to the cylinder, causing a vacuum to develop in the inlet side of the cylinder. In this case, the shuttle valve (or similar device) may move to send the higher of the two workport pressures to the pump so that the inlet side of the cylinder fills faster and prevents a vacuum from developing. However, a spool of the shuttle valve shifting back and forth may cause the pressures to fluctuate until the pressures stabilize between the supply and the return sides of the valve, which causes variability and fluctuation in the system operation. Further, the shuttle valve may add complexity and cost to the valve assembly.

It may thus be desirable to simplify construction of the valve assembly by having a different source for a pilot pressure, rather than a cross-over configuration, to open a counterbalance valve and reduce manufacturing costs.

SUMMARY

The present disclosure describes implementations that relate to a directional control valve. In a first example implementation, the present disclosure describes a valve section. The valve section includes: (i) a valve body having a longitudinal bore, a fluid inlet passage, and a workport configured to be fluidly connected to an actuator; (ii) a spool axially movable in the longitudinal bore to shift between a neutral position at which the spool is configured to block fluid flow to the workport, and a shifted position at which the spool is configured to permit fluid flow thereacross, where the valve body further includes a flow path disposed downstream from the spool and configured to fluidly couple the spool to the actuator through the workport; (iii) a pressure compensator valve located downstream from the fluid inlet passage and upstream from the spool and configured to regulate fluid flow from the fluid inlet passage to the spool, where the valve body further includes a regulated-flow fluid passage configured to communicate fluid from the pressure compensator valve to the spool; and (iv) a counterbalance valve disposed in the flow path, where the counterbalance valve includes a pilot pressure port, where the counterbalance valve is configured to open the flow path in response to a pilot pressure received at the pilot pressure port, where the valve body further includes a pilot pressure passage configured to communicate fluid to the pilot pressure port. When the spool is in the neutral position, the pilot pressure passage is disconnected from the regulated-flow passage, and when the spool is in the shifted position, the pilot pressure passage is connected across the spool to the regulated-flow fluid passage, such that the pilot pressure is derived from the regulated-flow fluid passage downstream from the pressure compensator valve to open the counterbalance valve.

In a second example implementation, the present disclosure describes a hydraulic valve assembly. The hydraulic valve assembly includes: (i) a valve body having a longitudinal bore, a fluid inlet passage, a first workport configured to be fluidly connected to a first side of an actuator, a first flow path configured to communicate fluid to and from the first side of the actuator through the first workport, a second workport configured to be fluidly connected to a second side of an actuator, and a second flow path configured to communicate fluid to and from the second side of the actuator through the second workport; (ii) a spool axially movable in the longitudinal bore to shift between a neutral position at which the spool blocks fluid flow to the workport, a first shifted position that defines a first variable area orifice configured to meter flow from the fluid inlet passage across the spool through the first flow path to the first workport, and a second shifted position that defines a second variable area orifice configured to meter flow from the fluid inlet passage across the spool through the second flow path to the second workport; (iii) a pressure compensator valve located downstream from the fluid inlet passage and upstream from the first and second variable area orifices to regulate flow from the fluid inlet passage to the first or second variable area orifice, and where the valve body further includes a regulated-flow fluid passage configured to communicate fluid from the pressure compensator valve to the first or second variable area orifice; (iv) a first counterbalance valve disposed in the first flow path, where the first counterbalance valve includes a first pilot pressure port, where the first counterbalance valve is configured to open the first flow path in response to a pilot pressure received at the pilot pressure port, where the valve body further includes a first pilot pressure passage configured to communicate fluid to the first pilot pressure port; (v) a second counterbalance valve disposed in the second flow path, where the second counterbalance valve includes a second pilot pressure port, where the second counterbalance valve is configured to open the second flow path in response to a respective pilot pressure received at the second pilot pressure port, where the valve body further includes a second pilot pressure passage configured to communicate fluid to the second pilot pressure port. When the spool is in the neutral position, the first and second pilot pressure passages are disconnected from the regulated-flow passage. When the spool is in the first shifted position, the second pilot pressure passage is connected across the spool to the regulated-flow fluid passage, such that the respective pilot pressure is derived from the regulated-flow fluid passage downstream from the pressure compensator valve and the second counterbalance valve is opened. When the spool is in the second shifted position, the first pilot pressure passage is connected across the spool to the regulated-flow fluid passage, such that the pilot pressure is derived from the regulated-flow fluid passage downstream from the pressure compensator valve and the first counterbalance valve is opened.

In a third example implementation, the present disclosure describes a hydraulic system. The hydraulic system includes: (i) a source of pressurized fluid; (ii) an actuator; (iii) a valve body configured to be fluidly coupled to the source and the actuator; (iv) a spool movable in the valve body intermediate the source and the actuator; (v) a pressure compensator valve disposed upstream from the spool and configured to regulate flow received from the source, where the valve body defines a first passage disposed upstream from the spool and configured to fluidly couple the pressure compensator valve to the spool, and a second passage disposed downstream from the spool and configured to fluidly couple the spool to the actuator; and (vi) a counterbalance valve disposed in the second passage downstream from the spool, where the counterbalance valve is opened to permit flow therethrough from the actuator to the spool in response to a pilot pressure derived from the first passage when the spool is shifted from a neutral position.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Disclosed herein are systems, valve sections, and valve assemblies that, among other features, reduce complexity and cost of manufacturing the valve.

Figure 1:
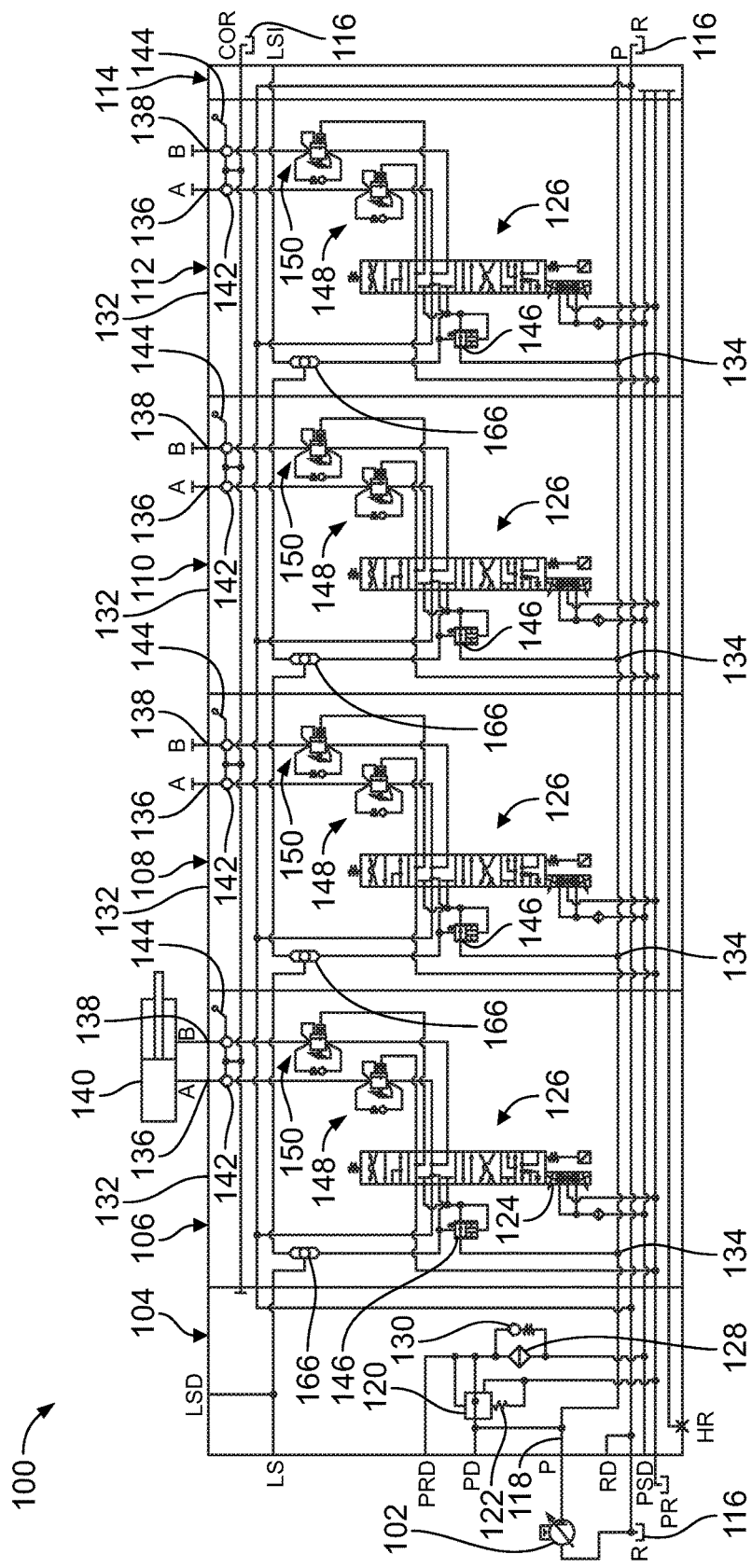
FIG. 1 illustrates a schematic of a hydraulic system, in accordance with an example implementation.

FIG. 1 illustrates a schematic of a hydraulic system 100, in accordance with an example implementation. The hydraulic system 100 includes a fluid source 102, such as a load sensing variable displacement pump or a load sensing flow/pressure source. The hydraulic system 100 also includes a valve assembly having an inlet section 104, a first worksection 106, a second worksection 108, a third worksection 110, a fourth worksection 112, and an outlet section 114. The illustrated hydraulic system 100 is provided for illustration purposes, an in other examples, more or fewer worksections could be used.

The sections 104, 106, 108, 110, 112, and 114 may be coupled together by fasteners (e.g., bolts screws, clamps, etc.) to provide an assembly of valve sections that is an assembly. For example, the worksections 106, 108, 110, and 112 may be positioned adjacent one another between the inlet section 104 and the outlet section 114 of the valve assembly.

The worksections 106, 108, 110, 112 may be the same as each other as shown in FIG. 1, and the same reference numerals are used to refer to the same or similar structures. However, in other examples, one or more of the worksections 106, 108, 110, 112 may be different from one another.

As shown in FIG. 1, the source 102 may receive fluid from a reservoir 116 to provide fluid to the inlet section 104 through an inlet passage 118. The inlet section 104 may include a pressure reducing relieving valve 120. The pressure reducing relieving valve 120 may be configured to reduce supply pressure from the source 102 to a predetermined pressure level. The predetermined pressure level may be equal to the sum of a force from a biasing device 122 and a pilot return to reservoir pressure.

The output fluid flow from the pressure reducing relieving valve 120 may be communicated to the first worksection 106 as a pilot supply flow pressure to control electro-hydraulically actuated solenoids 124 of a main control valve 126, as is described in further detail below. In an example, one solenoid could be used for each main control valve 126. For instance, one solenoid having two coils could be used to actuate the main control valve 126. In another example, two solenoids could be coupled to each main control valve 126 such that one solenoid is configured to move a spool of the main control valve 126 in a first direction, and a second solenoid is configured to move the spool in a second direction opposite the first direction. One solenoid 124 is referenced in FIG. 1 for each main control valve 126 to reduce visual clutter in the drawing. The inlet section 104 may also include a filter 128 with a bypass check valve 130 to filter the pressure relieving reducing valve output flow.

The outlet section 114 may receive fluid from any of the inlet section 104, the first worksection 106, the second worksection 108, the third worksection 110, and/or the fourth worksection 112. The outlet section 114 may have a valve assembly reservoir port that enables the fluid to flow to the reservoir 116 for later use by the source 102.

Each worksection 106, 108, 110, 112 may have a valve body 132 shown schematically in FIG. 1 as an envelope border, for illustration. Each worksection 106, 108, 110, 112 may also have a fluid inlet passage 134 and one or more outlet passages or workports 136 and 138. Each worksection 106, 108, 110, 112 may include a respective main control valve 126 configured to control fluid flow and pressure from the inlet passage 134 to the one or more workports 136, 138.

The workports 136, 138 may be fluidly connected to one or more associated hydraulic fluid receiving devices, e.g., a cylinder 140, of the machinery. Although the fluid receiving device is shown as the cylinder 140 in FIG. 1, other devices could be controlled by the hydraulic system 100 such as rotary motors.

In examples, the one or more workports 136, 138 may have quick connect/disconnect couplers 142. The quick connect/disconnect couplers 142 may be configured to minimize spillage, and may utilize a lever 144 that relieves trapped pressure to a drain passage COR (clean oil return) when the lever 144 is actuated to release the cylinder 140, which is hydraulically coupled to the one or more workports 136, 138.

Figure 2:
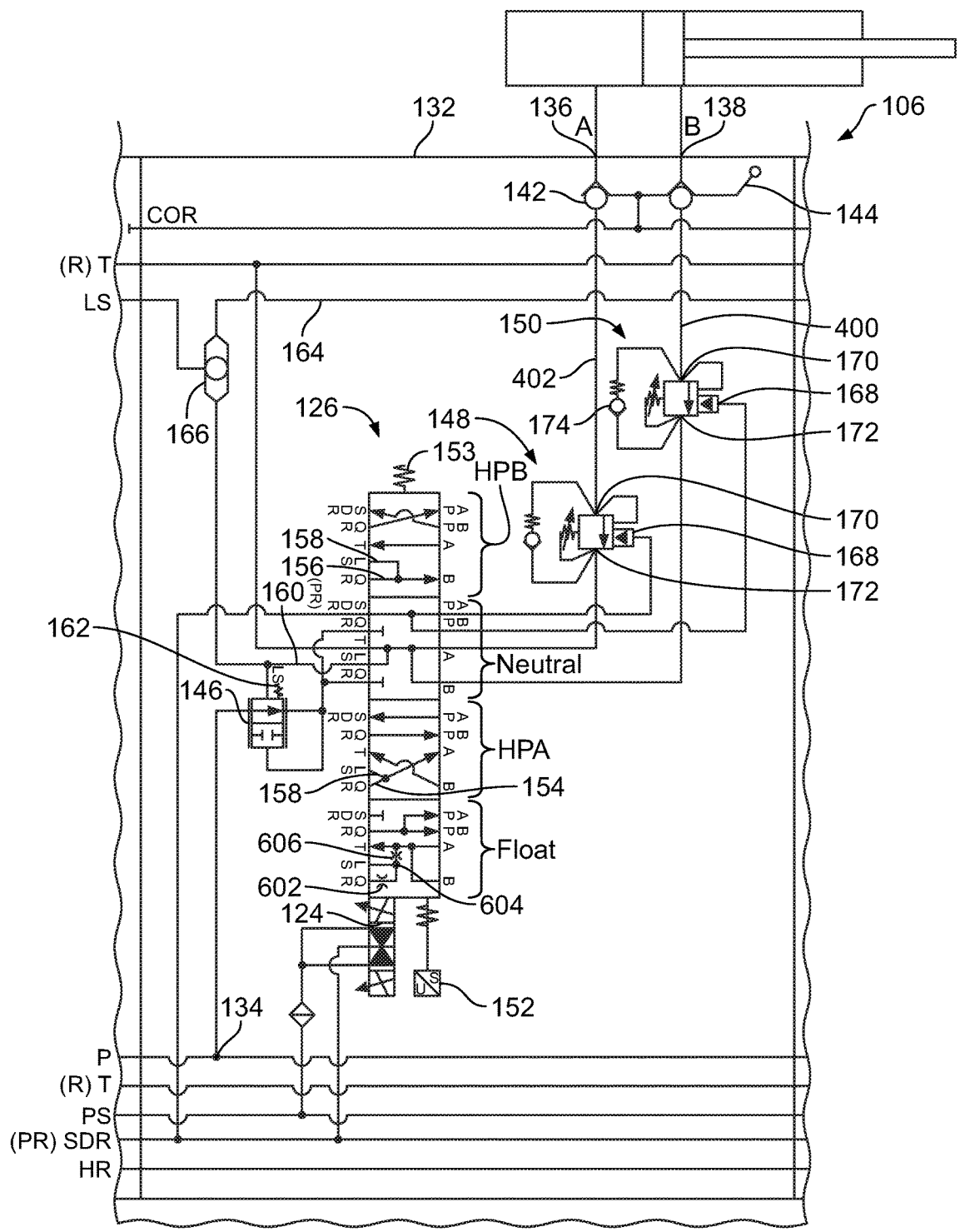
FIG. 2 illustrates a zoomed-in view of a worksection from the schematic in FIG. 1, in accordance with an example implementation.
Figure 3A:
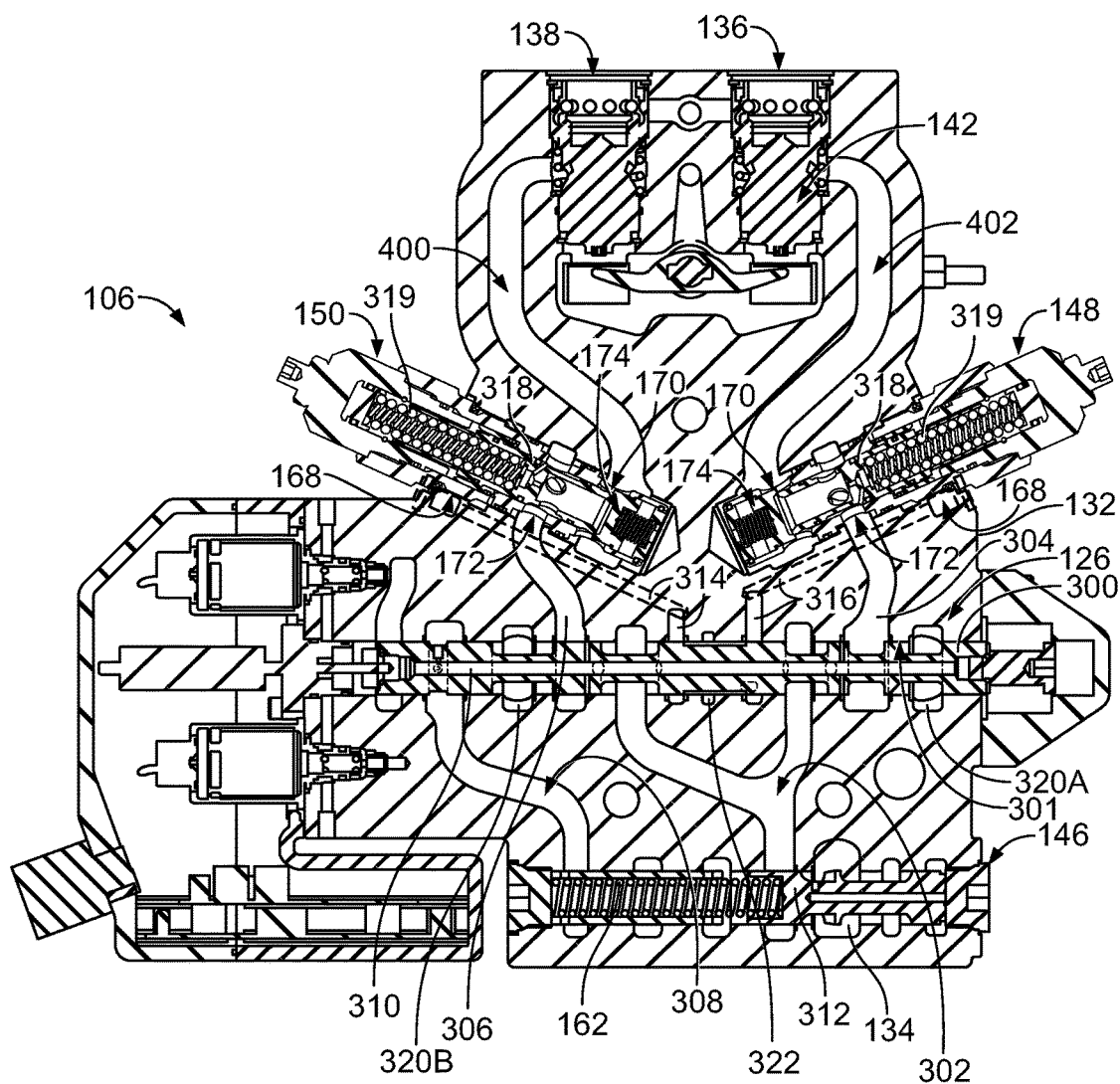
FIG. 3A illustrates a cross section of the worksection of FIG. 2, in accordance with another example implementation.

FIG. 2 illustrates a zoomed-in view of the first worksection 106 from the schematic in FIG. 1, and FIG. 3A illustrates a cross section of the first worksection 106, in accordance with an example implementation. FIGS. 2 and 3A are described together.

As described above, the first worksection 106 includes a valve body 132, the fluid inlet passage 134, and the workports 136 and 138. The main control valve 126 of the first worksection 106 forms a fluid flow path that may fluidly connect and meter flow between the inlet passage 134 and the one or more workports 136, 138.

The first worksection 106 also includes a pressure compensator valve 146 located downstream from the inlet passage 134 and upstream from the main control valve 126. The first worksection 106 further includes counterbalance valves 148, 150 associated with the respective workports 136, 138. As shown, the counterbalance valves 148, 150 may be disposed in the fluid flow path that supplies fluid to the fluid receiving device (supply path) or the fluid flow path that returns fluid from the fluid receiving device (return path), as discussed in further detail below.

The main control valve 126 may be a directional control valve having a main control spool 300 (shown in FIG. 3) slidably movable in a longitudinal bore 301 in the valve body 132. FIG. 3A illustrates the main control spool 300 in a neutral position.

A first end of the main control spool 300 may be configured to be connected to an external input command device, which may be, for example, a lever, a handle or a joystick that is manually operated by a human operator, a pilot signal, an electrical signal, solenoids, electrohydraulic proportional solenoid valves, a computer program, a wireless signal, or any other suitable input that directly or indirectly causes operation of a valve. The first worksection 106 may also include on-board electronics connected to the valve body 132. The on-board electronics may include a controller and a position transducer 152 (shown in the schematic of FIG. 2) electrically coupled to the main control spool 300 to communicate position of the main control spool 300 and command actuation thereof to a desired (e.g., working) position.

A second end of the main control spool 300 may interface with a biasing device 153 (shown in FIG. 2), such as a spring, for returning the main control spool 300 to a neutral position. The main control valve 126 may have cooperating main control valve surfaces that define one or more variable area orifices 154, 156, which are spool to bore cylindrical area openings between the main control spool 300 and the internal surfaces of the valve body 132 when the main control spool 300 shifts axially therein (see FIGS. 4-5 below). In the illustrated schematic of FIG. 2, the variable area orifices 154, 156 are shown as the line segments upstream of a load-sense (LS) pressure signal sense point of the lines connecting regulated flow (QR) passage and A or B passages. These passages are depicted in FIG. 3A as QR passage 302, A passage 304, and B passage 306.

In examples, the main control spool 300 may have a plurality of annular grooves or axial notches that cooperate with internal surfaces of the valve body 132 to define a metering orifice (e.g., the orifices 154, 156). Axial position of the main control spool 300 may be adjusted with respect to the valve body 132 to variably adjust the area of the metering orifice (variable area orifice) defined by the main control spool 300. By adjusting the cross-sectional area of the main valve variable area orifice 154 or 156, and regulating the pressure drop across the orifice, supply flow from the inlet passage 134 across the main control valve 126 can be metered to the workport 136 or 138. Further, the main control valve 126 may have flow directional surfaces (e.g., lands), which direct the fluid flow to the workport 136 or 138 depending on the position of the main control spool 300 in the valve body 132.

In the implementation illustrated in FIGS. 2 and 3A, the pressure compensator valve 146 is located downstream from the inlet passage 134 and upstream from the main control spool 300. Thus, the pressure compensator valve 146 may be referred to as a pre-pressure compensator valve. The pressure compensator valve 146 is configured to control supply pressure and regulate supply flow from the inlet passage 134 to the main control valve 126. The regulated pressure flow is referred to herein as "QR" and the fluid passage that communicates QR from the pressure compensator valve 146 to the main control spool 300 is the QR passage 302 shown in FIG. 3.

As shown in FIG. 2, the pressure compensator valve 146 reacts to the pressures upstream and downstream from the variable area orifice 154, 156. Particularly, referring to FIG. 3, the pressure compensator valve 146 reacts to pressure in the QR passage 302 (upstream pressure) and the pressure in a load-sense (LS) passage 308 (downstream pressure). The LS passage 308 is connected to either the A passage 304 or the B passage 306 through an internal channel 310 disposed within the main control spool 300 and centered about a longitudinal axis of the main control spool 300. The axial position of the main control spool 300 determines whether the A passage 304 or the B passage 306 is connected to the LS passage 308, and thus determines whether the workport 136 or 138 is connected to the LS passage 308. When the main control spool 300 is shifted to either side from the neutral position of FIG. 3, the workport with the high pressure fluid is connected to the LS passage 308 through the corresponding A passage 304 or B passage 306.

With this configuration, the pressure compensator valve 146 controls a pressure differential (pressure in the QR passage 302 minus pressure in the LS passage 308), which is the pressure differential across the variable area orifice 154 or 156 when the main control spool 300 is shifted. Therefore, the pressure compensator valve 146 regulates supply flow to the workport 136 or 138. In other words, the pressure compensator valve 146 may be configured to maintain the pressure differential across the variable area orifice 154 or 156 based on the difference in pressure between the pressure in the QR passage 302 and a load-sense pressure in the LS passage 308.

In an example, the pressure compensator valve 146 may include a valve spool 312 movable in the supply flow path between open and closed positions. The valve spool 312 is exposed to the upstream pressure (pressure in the QR passage 302) at one end and downstream pressure (pressure in the LS passage 308) at an opposite end so as to maintain the pressure differential. As shown schematically in FIG. 2, a bridge passage 158 may be provided to connect the downstream pressure from the metered supply variable area orifice 154 or 156 to a load-sense passage 160, which is ultimately connected to the LS passage 308. The load-sense passages 160 and 308 thus enable communication of the pressure feedback signal at the work side of the fluid operated device (e.g., the cylinder 140) to the pressure compensator valve 146.

When the difference in pressure between the pressure in the QR passage 302 and the load-sense pressure in the LS passage 308 exceeds a pressure that is set by a biasing device, e.g., spring 162, of the pressure compensator valve 146, the valve spool 312 moves. The valve spool 312 may move in the supply flow path to maintain the compensator spring pressure differential across the metering orifice 154, 156. With this configuration, the supply flow to the workport 136 or 138 is regulated.

Further, the example valve assembly of the hydraulic system 100 illustrated in FIG. 1 is a load-sense assembly of valve sections that provides a pressure feedback signal through a feedback passage 164 shown schematically in FIG. 2. The pressure feedback signal of the assembly of valve sections is the workport pressure of the worksection 106, 108, 110, or 112 that has the highest pressure level in the assembly of valve sections. The highest pressure level is determined or resolved through the use of a load-sense shuttle or check valve 166 shown in FIGS. 1 and 2.

For example, as shown schematically in FIG. 2, the load-sense check valve 166 is configured as a two-position, three-way load-sense check or shuttle type system. In another example, a two-way load-sense check valve system with a single quiescent load-sense vent may also be used. Alternatively, no load-sense check system may be used if the hydraulic system 100 includes one worksection.

As shown in FIGS. 2 and 3A, the counterbalance valves 148, 150 are used in the return path of fluid flow from the fluid receiving device (e.g., the cylinder 140), and may be used for lowering a large negative load in a controlled manner. For example, the counterbalance valves 148, 150 may be configured to restrict return flow to generate a preload or back-pressure in the return path that acts against the pressure on the supply side so that the load remains positive and therefore controllable. As illustrated in FIGS. 2 and 3A, the counterbalance valves 148, 150 are associated with each of the respective workports 136, 138 so as to control both directions of motion of the hydraulic fluid receiving device (e.g., the cylinder 140) against a negative load.

The counterbalance valves 148, 150 may further be configured to enable free flow across the counterbalance valves 148, 150 in the supply direction, but block flow in the return direction until a pilot pressure is applied to the counterbalance valves 148, 150. As shown schematically in FIG. 2, the pilot pressure signal AP or BP for opening the counterbalance valve 148, 150 is derived from QR flow (flow in the QR passage 302 in FIG. 3) that is downstream from the pressure compensator valve 146 and upstream from the variable area orifice 154, 156. For example, referring to FIG. 3, when the main control spool 300 is shifted, the QR passage 302 is connected to pilot signal passage BP 314 of the counterbalance valve 150 or pilot signal passage AP 316 of the counterbalance valve 148.

Figure 3B:
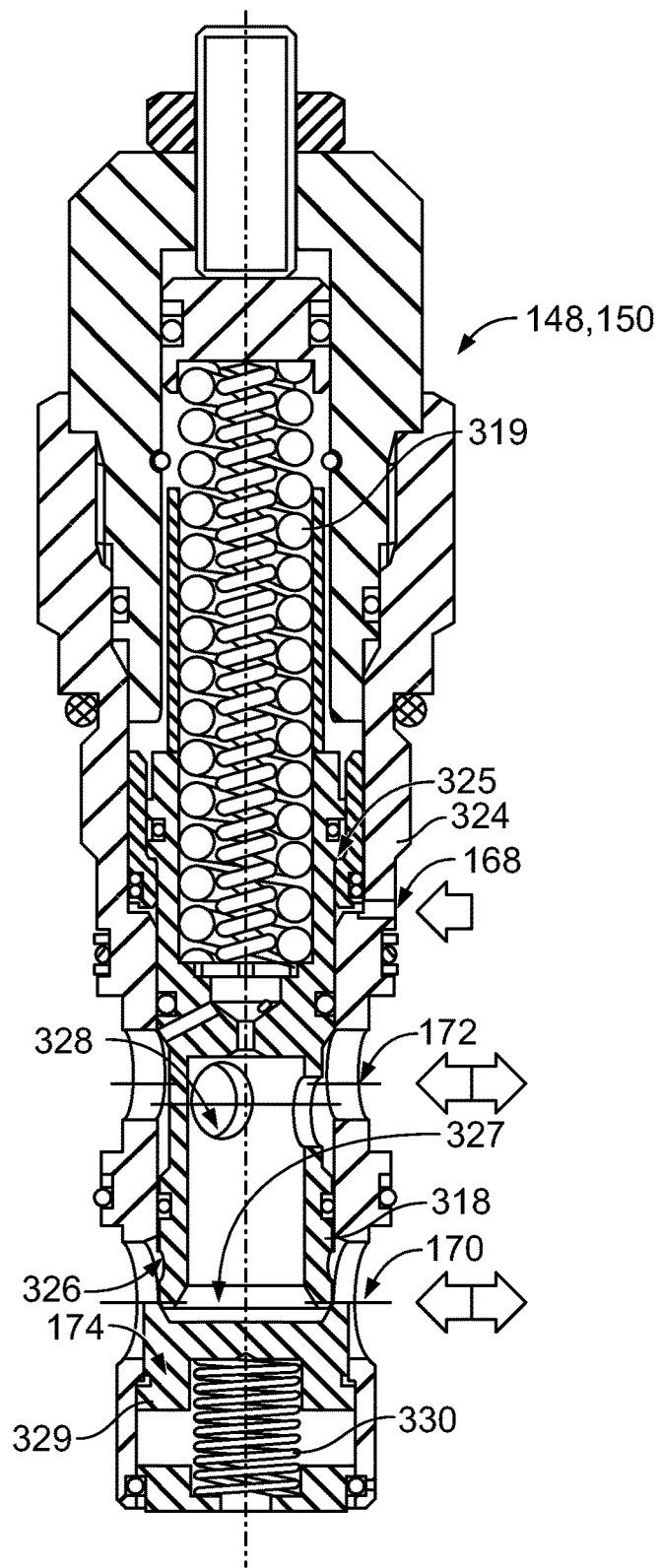
FIG. 3B illustrates a cross section of a counterbalance valve, in accordance with an example implementation.

FIG. 3B illustrates a cross section of the counterbalance valve 148, 150, in accordance with an example implementation. In examples, the counterbalance valve 148, 150 may include a valve member 318 (e.g., a poppet). The counterbalance valve 148, 150 also includes a pilot port 168, a load pressure port 170 configured to receive fluid from the return flow path upstream of the counterbalance valve 148, 150, and an inlet port 172 that receives flow from the corresponding the A passage 304 or B passage 306.

The counterbalance valve 148, 150 also includes a valve body 324 that defines paths or channels that communicate the pilot pressure from the pilot port 168 to a shoulder 325 of the valve member 318. Further, the fluid received at the load pressure port 170 applies pressure on a shoulder 326 of the valve member 318. The pressure applied on the valve member 318 by fluid received at the load pressure port 170 acts on the valve member 318 in the same direction as the pressure applied thereon via the fluid received at the pilot port 168.

This configuration allows the counterbalance valve 148, 150 to open the return flow path across the counterbalance valve 148, 150 based on a pressure setting determined by a spring 319 that acts on the valve member 318 in a direction opposite to the direction of pressure application via fluid at the load pressure port 170 and the pilot port 168. Particularly, the fluid pressure in the return flow path communicated via the load pressure port 170 may generate a pressure against the counterbalance valve member 318 for achieving at least a portion of the pressure setting defined by the spring rate of the spring 319. In addition, the pilot pressure communicated via the pilot port 168 generates an additional pressure for achieving at least a portion of the pressure setting defined by the spring rate of the spring 319. In examples, the pilot pressure is exerted on an area that generates force against the valve member 318 that is between 3 to 8 times larger than the force generated by fluid received via the load pressure port 170.

Once the pilot pressure at the pilot port 168 and the pressure at the load pressure port 170 exert sufficient pressure on the valve member 318 that exceeds the pressure setting defined by the spring 319 plus spring chamber pressure (which depends on venting type of the counterbalance valve), the valve member 318 moves (e.g., lifts upward in FIG. 3B). As a result, fluid received at the load pressure port 170 is communicated through a nose 327 of the valve member 318 to an internal space of the valve member 318, then through holes 328 to the inlet port 172.

The counterbalance valve 148, 150 may further include a free-flow check valve 174 configured to allow free flow in the supply direction from the inlet port 172 to the load pressure port 170. The free-flow check valve 174 includes a check valve poppet 329 supported by a spring 330. Fluid received through the inlet port 172 is communicated through holes 328 to the internal space within the valve member 318 and applies a pressure against the check valve poppet 329. The pressure pushes the check valve poppet 329 against the spring 330 and moves the check valve poppet 329 to expose the load pressure port 170. This way, fluid received at the inlet port 172 is communicated freely to the load pressure port 170. In other examples, the free-flow check valve 174 may be separate from the counterbalance valve 148, 150 and connected in parallel therewith.

Operation of the worksection 106 is described next when the main control spool 300 is at different operating positions. Referring to FIGS. 2 and 3A, when the main control spool 300 is in a neutral position, the regulated flow in the QR passage 302 is blocked. In addition, the A passage 304 and the B passage 306 are connected to tank (T) passages 320A and 320B, which are connected to the reservoir 116 shown in FIG. 1.

In addition, pilot passage AP 316 and pilot passage BP 314, which are connected to the respective pilot port 168 of the respective counterbalance valves 148 and 150, are connected to a solenoid drain passage (SDR) 322. The SDR passage 322 is a dedicated drain connection for the worksection electrohydraulic spool actuation solenoids (e.g., the solenoids 124) and counterbalance pilot signals to the reservoir 116. The SDR passage 322 is separated and is not exposed to elevated return flow pressure in the path between the T passages 320A and 320B and the reservoir 116. The LS passage 308 is also connected to the tank or reservoir 116 via both T passages 320A and 320B.

As such, in the neutral position shown in FIG. 3, the QR passage 302 is not connected to either the pilot passage AP 316 or the pilot passage BP 314. Thus, the counterbalance valves 148 and 150 are not piloted and remain closed. A shift in the axial position of the main control spool 300 within the longitudinal bore 301 may cause one or both of the pilot passage AP 316 and the pilot passage BP 314 to be connected to the QR passage 302 to provide pilot pressure to a respective counterbalance valve and open it, as described next with respect to FIGS. 4-6.

Figure 4:
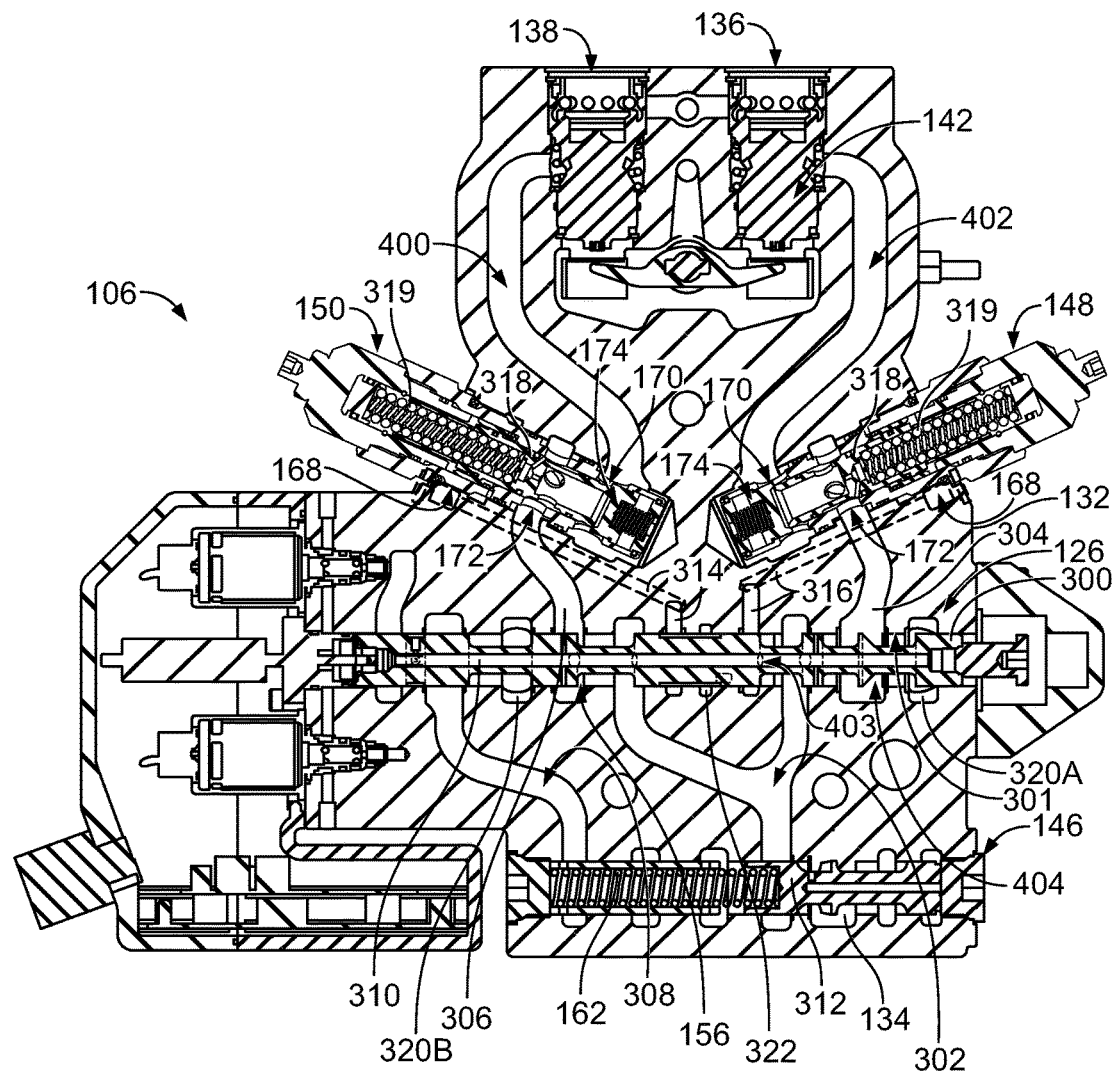
FIG. 4 illustrates a main control spool shifted to a first position, in accordance with an example implementation.

FIG. 4 illustrates the main control spool 300 shifted to a first position, in accordance with an example implementation. The first position is referred to herein as high-pressure position (HPB) as it involves providing high pressure fluid to the B workport 138.

Referring to FIGS. 2 and 4, in the HPB position, the regulated supply flow QR output from the pressure compensator valve 146 through the QR passage 302 is metered across the variable area orifice 156, which is formed as the main control spool 300 shifts to the left as depicted in FIG. 4. This metered flow then passes via the B passage 306 to the inlet port 172 of the counterbalance valve 150. The metered flow then passes across the counterbalance valve 150 unrestricted via free-flow check valve 174, and then exits the counterbalance 150 at the load pressure port 170 and flows through passage 400 to the workport 138.

The pilot passage BP 314, which is connected to the pilot port 168 of the counterbalance valve 150, is connected to the SDR passage 322 through a recessed area in the exterior peripheral surface of the main control spool 300. In addition, the load pressure from the workport 138 is communicated to the pressure compensator valve 146 via the LS passage 160 and the LS passage 308 to control supply pressure and regulate supply flow, as discussed above.

On the return side of the first high-pressure position HPB, fluid flow is returned from the fluid receiving device (e.g., the cylinder 140) via the workport 136 and passage 402 to the counterbalance valve 148 disposed in the return flow path. As discussed above, the fluid pressure in the return flow path acts on the valve member 318 of the counterbalance valve 148 via the load pressure port 170, thus generating at least a portion of the force that activates the counterbalance valve 148 and open the return flow path.

In addition, due to the shifted position of the main control spool 300, the QR passage 302 is connected to the pilot passage AP 316 via a spool meter notch 403 depicted by dashed lines in FIG. 4. Thus, high pressure fluid in the QR passage 302 is communicated via the pilot passage AP 316 to the pilot port 168 of counterbalance valve 148.

With is configuration, when the main control spool 300 is shifted to the first high-pressure positon HPB, the pilot passage AP 316 is connected to the metered flow in the QR passage 302. Thus, the pilot pressure communicated to the pilot port 168 through the passage AP 316 is derived from the flow downstream from the pressure compensator valve 146 and upstream from the variable area orifice 156.

This pilot high pressure fluid at the pilot port 168 generates an additional force for achieving at least a portion of the pressure setting for opening the return flow path, as discussed above. The combination of the pressures applied to the valve member 318 by fluid at the load pressure port 170 and fluid at the pilot port 168 overcome the spring 319 and the spring chamber pressure to activate or open the counterbalance valve 148. When the counterbalance valve 148 is activated, the return flow path to the A passage 304 is opened. As a result, fluid flows across the counterbalance valve 148, through the A passage 304 and a spool to bore cylindrical area opening 404 to the T passage 320A and ultimately to the reservoir 116.

Figure 5:
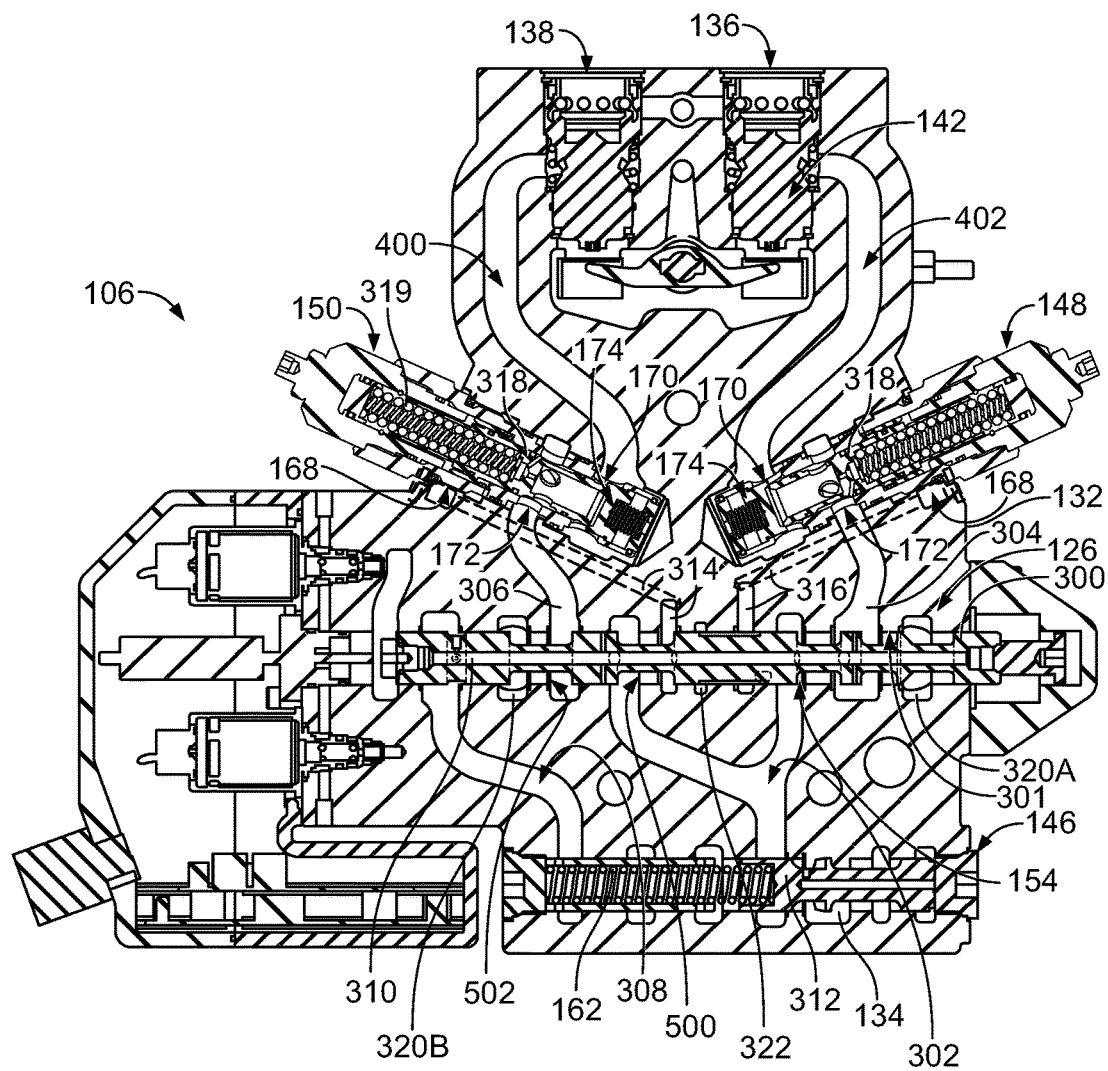
FIG. 5 illustrates the main control spool shifted to a second position, in accordance with an example implementation.

FIG. 5 illustrates the main control spool 300 shifted to a second position, in accordance with an example implementation. The second position is referred to herein as high-pressure position (HPA) as it involves providing high pressure fluid to the A workport 136.

Referring to FIGS. 2 and 5, in the HPA position, the output flow QR from the pressure compensator valve 146 flows through the QR passage 302 and is then metered across the variable area orifice 154, which is formed as the main control spool 300 shifts to the right as depicted in FIG. 5. This metered regulated flow then passes through the A passage 304 to the inlet port 172 of counterbalance valve 148. The metered regulated supply flow then passes across counterbalance valve 148 via unrestricted free-flow check valve 174 and the load pressure port 170 through passage 402 to the workport 136.

The pilot passage AP 316, which is connected to the pilot port 168 of the counterbalance valve 148, is connected to the SDR passage 322 through the recessed area in the exterior peripheral surface of the main control spool 300. In addition, the load pressure from the workport 136 is communicated to the pressure compensator valve 146 via load-sense passage 160 and the LS passage 308 to control supply pressure and regulate supply flow, as discussed above.

On the return side of the second high-pressure position HPA, fluid flow is returned from the fluid receiving device (e.g., the cylinder 140) via the workport 138 and the passage 400 to the counterbalance valve 150 disposed in the return flow path. As discussed above, the fluid pressure in the return flow path acts on the valve member 318 of the counterbalance valve 150 via the load pressure port 170, thus generating at least a portion of the force that activates the counterbalance valve 150 and open the return flow path.

In addition, due to the shifted position of the main spool 300, the QR passage 302 is connected to the pilot passage BP 314 via a spool to bore cylindrical area opening 500. Thus, high pressure fluid in the QR passage 302 is communicated via the pilot passage BP 314 to the pilot port 168 of counterbalance valve 150. This high pressure fluid generates an additional force for achieving at least a portion of the pressure setting for opening the return flow path, as discussed above.

With is configuration, when the main control spool 300 is shifted to the second high-pressure positon HPA, the pilot passage BP 314 is connected to the metered flow in the QR passage 302. Thus, the pilot pressure communicated to the pilot port 168 of the counterbalance valve 150 through the passage BP 314 is derived from the flow downstream from the pressure compensator valve 146 and upstream from the variable area orifice 154.

The combination of the pressures applied to the valve member 318 by fluid at the load pressure port 170 and fluid at the pilot port 168 overcome the spring 319 and the spring chamber pressure to activate or open the counterbalance valve 150. When the counterbalance valve 150 is activated, the return flow path to the B passage 306 is opened. As a result, fluid flows across the counterbalance valve 150, through the B passage 306 and a spool to bore cylindrical area opening 502 to the T passage 320B and ultimately to the reservoir 116.

Figure 6:
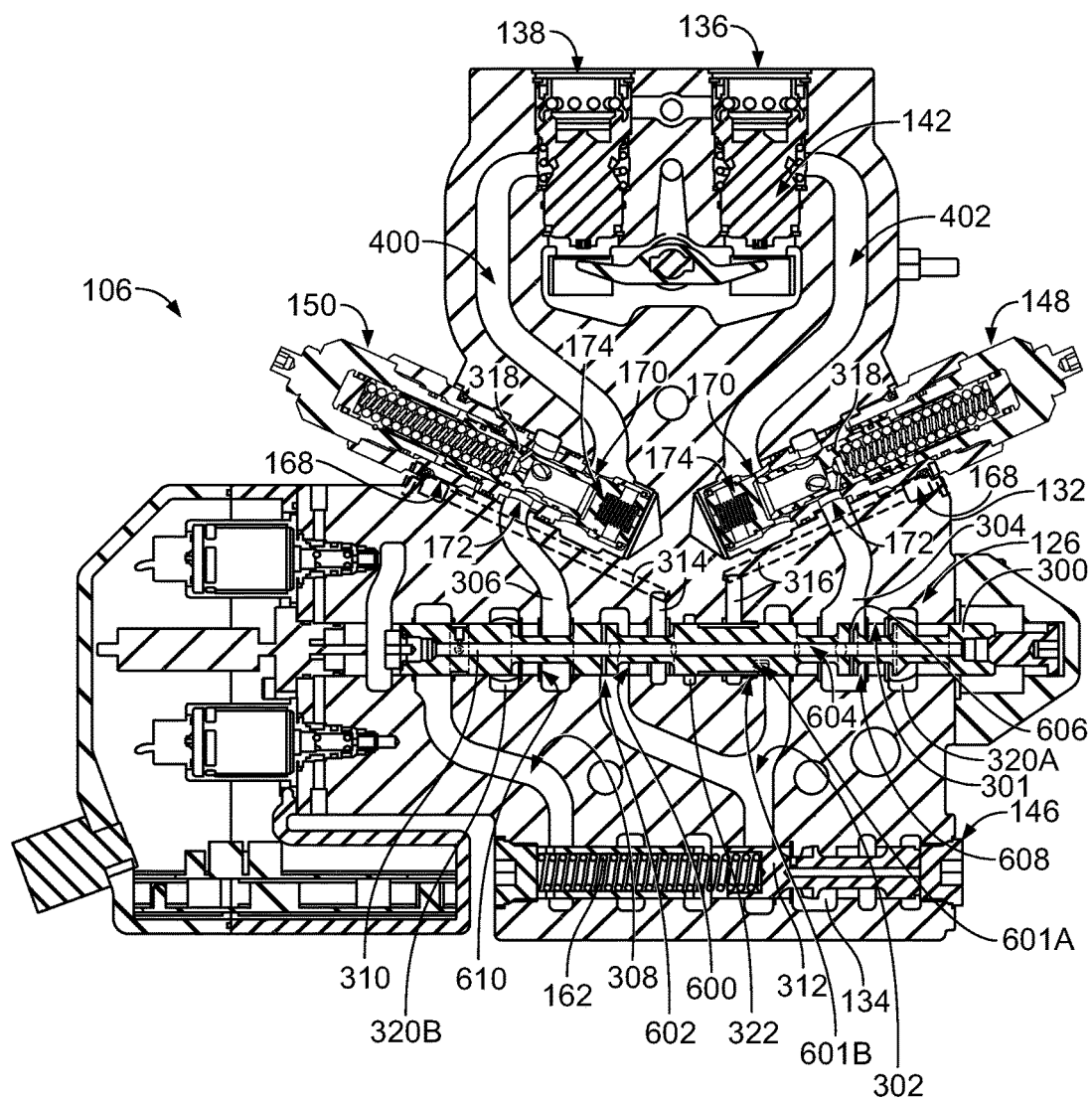
FIG. 6 illustrates the main control spool shifted to a third (float) position, in accordance with an example implementation.

The four-position, four-way main control valve 126 also includes a float position in which supply flow from the source 102 is connected to load-sense and pilot pressure generation circuits, and the workports 136 and 138 are connected to the tank or reservoir 116. FIG. 6 illustrates the main control spool 300 shifted to a third (float) position, in accordance with an example implementation.

Referring to FIGS. 2 and 6, in the float position, the regulated flow in the QR passage is connected to the pilot passage BP 314 via a spool to bore cylindrical area opening 600. The regulated flow in the QR passage is also connected to the pilot passage AP 316 via spool notch 601A and a recess 601B in an inner diameter of the longitudinal bore 301.

As shown in FIGS. 2 and 6, the float position defines an orifice 602 (e.g., a fixed orifice) upstream of a load-sense signal point 604 in the channel 310, and an orifice 606 (e.g., a fixed orifice) downstream of the load-sense signal point 604. The upstream orifice 602 demands a small "trigger" amount of fluid flow, such as 0.5 gallons per minute (gpm), and the downstream orifice 606 restricts an amount of fluid flow equal to the trigger amount (e.g., 0.5 gpm). For example, the upstream orifice 602 that is connected to QR passage 302 may be configured to connect an outer peripheral surface of the main control spool 300 to the inner channel 310. The trigger amount of fluid then flows through the channel 310 to the downstream orifice 606. The orifice 606 connects the channel 310 to a portion of the outer peripheral surface of the main control spool 300 that is exposed to the A passage 304 and fluidly connected to the T passage 320A via a variable orifice 608.

The trigger amount of flow generates sufficient load-sense pressure in the channel 310 that causes the pressure compensator valve 146 to output flow in the QR passage 302 having a high pressure. This high pressure flow is then communicated to the pilot pressure passages AP 316 and BP 314 to open the counterbalance valves 148 and 150. In other words, the orifices 602 and 606 create an artificial load that is perceived by the pressure compensator valve 146, and causes the pressure compensator valve 146 to output flow having a pressure sufficient to open the counterbalance valves 148 and 150.

Such a configuration operates similar to the pressure compensator valve 146 regulating the pressure differential (pressure in the QR passage 302 minus pressure in the LS passage 308) across the variable orifice (154 or 156) for a given HPA or HPB position (see FIGS. 5 and 4). The upstream orifice 602 is similar to a fixed area equivalent to the variable area orifice 154 or 156. The orifice 602 demands a particular amount of flow (e.g., 0.5 gpm) because a pressure difference equal to (pressure in the QR passage 302 minus pressure in the LS passage 308) is maintained there-across. The LS pressure that is communicated to the pressure compensator valve 146 via the LS passage 308 is sensed upstream of the orifice 606, which restricts the 0.5 gpm to create a pre-determined LS pressure in the channel 310, causing the pressure compensator valve 146 to generate regulated flow and pilot pressure to the counterbalance valves 148, 150.

As shown in FIG. 6, in the float position, the workport 136 is connected to the reservoir 116 through the passage 402, the counterbalance valve 148, the A passage 304, orifice 608, and the T passage 320A. Similarly, the workport 138 is connected to the reservoir 116 through the passage 400, the counterbalance valve 150, the B passage 306, an orifice 610, and the T passage 320B.

As shown and described with respect to FIGS. 2-6, the pilot pressure in the passages AP 316 and BP 314 to the counterbalance valves 148, 150 is derived from the flow output by the pressure compensator valve 146 in the QR passage 302. Thus, the pilot pressure for activating the counterbalance valve 148, 150 equals the load-sense pressure of fluid in the LS passage 308 plus the pressure of the compensator spring 162. In this manner, the counterbalance pilot system may efficiently sense a drop in the load-sense pressure, which causes a drop in the pilot pressure, and thereby closes off or restricts the return flow path across the counterbalance valve. Such a configuration of the counterbalance pilot system may eliminate the need for a shuttle valve that compares the workport pressures to preclude a vacuum from developing in the inlet side of a hydraulic actuator. Thus, the above-described counterbalance pilot system can simplify construction of the valve assembly and reduce manufacturing costs. In addition, by deriving the pilot pressure for the counterbalance valves 148, 150 downstream from the pressure compensator valve 146 (in the QR passage 302) and upstream of the metering variable orifice (154, 156) of the main control spool 300, the length of the longitudinal bore 301 of the main control spool 300 may be reduced, which further simplifies construction and reduces costs.

Further, deriving the pilot pressure for the counterbalance valves 148, 150 downstream from the pressure compensator valve 146 and upstream of the metering variable orifice eliminates the need to tap cross-over pressure lines to derive pilot pressure signals for the counterbalance valves. As such, complexity and manufacturing cost are reduced.

In addition, such a configuration may reduce the load-sense pressure, and therefore the P port pressure and horsepower, required to open the counterbalance valve 148 or 150 when low workport pressures occur. For example, the load-sense pressure may be less in the configurations described above because, rather than using load-sense pressure as pilot, the greater pressure of fluid in the QR passage 302 is being used as the pilot pressure source for opening the counterbalance valve 148, 150. This feature may be beneficial when an unloaded machine function is lowered with gravity assistance. In this example, the actuator load pressure and pilot pressure forces combine to open the counterbalance valve on the return side, so pilot pressure may increase as actuator load decreases.

Figure 7:
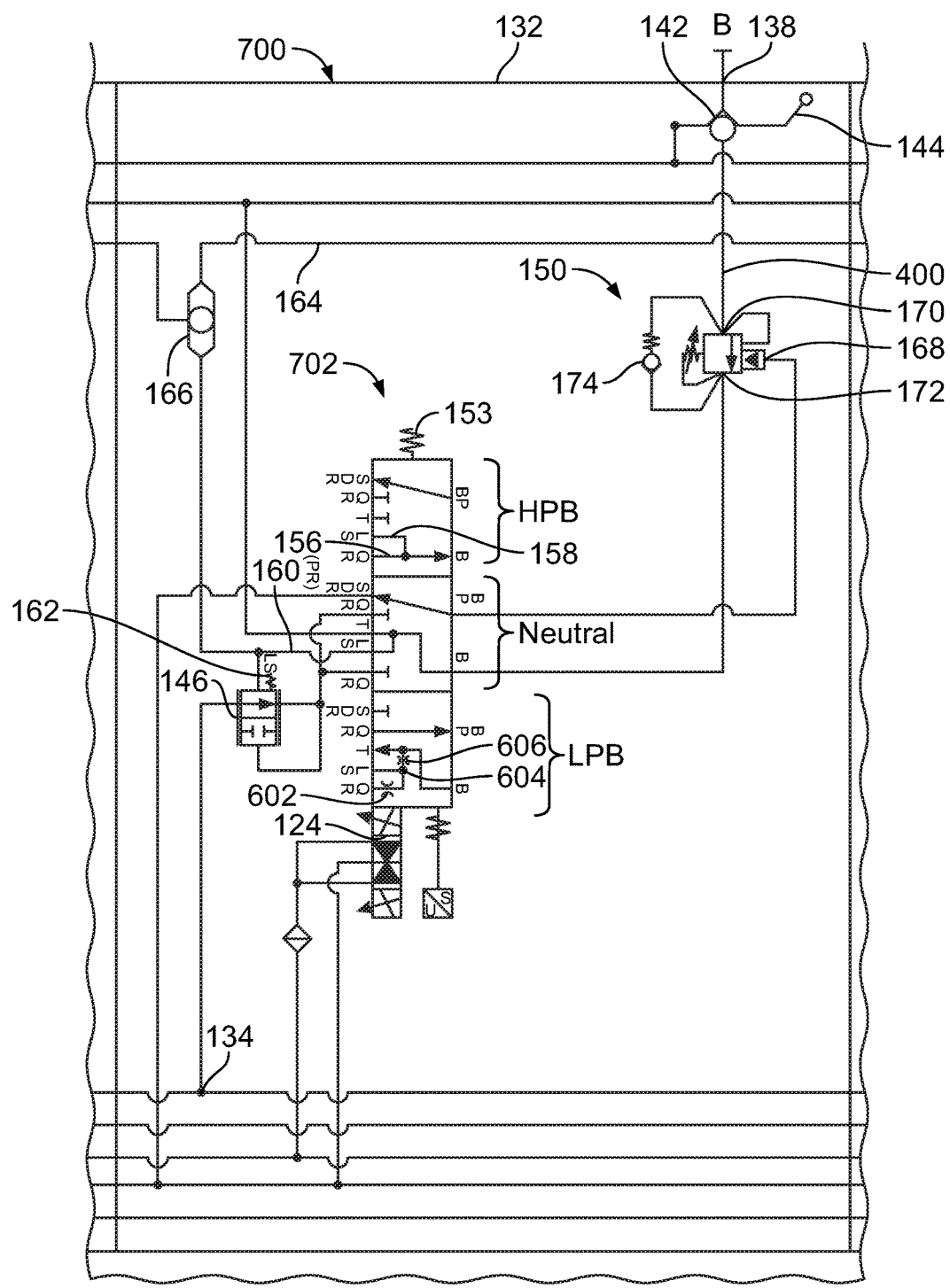
FIG. 7 illustrates a three-way directional control valve, in accordance with an example implementation.

Although the description above with respect to FIG. 1-6 refers to a four-way four-position valve, other valve configurations could be implemented. FIG. 7 illustrates a three-way directional control valve, in accordance with an example implementation. FIG. 7 shows a worksection 700 that is similar to the above-referenced worksection 106. Therefore, the same reference numerals are used to refer to the same or similar structures in the worksection 700. In addition, the foregoing description of the worksection 106 is equally applicable to the worksection 700 except as noted below.

Moreover, aspects of the worksections may be substituted for one another or used in conjunction with one another where applicable. Also, the worksection 700 could be inserted next to any of the worksections 106, 108, 110, 112 in the assembly of worksections, or the worksection 700 could replace any of the worksections 106, 108, 110, 112 depending on the operational requirements of the hydraulic system 100.

The worksection 700 includes the valve body 132 (shown schematically as envelope border, for example), the fluid inlet passage 134, the outlet passage or workport 138, and a main control valve 702 configured to meter supply flow from the inlet passage 134. The worksection 700 also includes the pressure compensator valve 146 located downstream from the inlet passage 134 and upstream from the main control valve 702. The worksection 700 further includes the counterbalance valve 150 associated with the workport 138.

The main control valve 702 is configured as a three-position, three-way directional control valve. When the main control valve 702 is in a neutral position, as shown in FIG. 7, the supply flow to the QR passage is blocked. In addition, the B passage is connected to the tank or reservoir. In addition, the pilot passage BP, which is connected to the counterbalance valve 150, is connected to a solenoid drain passage SDR. The load-sense signal LS is also connected to the tank or reservoir.

Similar to the description above with respect to FIGS. 2 and 4, when a spool of the main control valve 702 is shifted to a high-pressure position HPB, the output flow QR from the pressure compensator valve 146 is metered across the variable area orifice 156, and this metered flow passes via the B passage to the counterbalance valve 150. The flow then passes across counterbalance valve 150 via unrestricted free-flow check valve 174 and the passage 400 to the workport 138 to supply pressurized fluid to the fluid receiving device (e.g., a cylinder).

The pilot passage BP, which is connected to the pilot port 168 of the counterbalance valve 150, is also connected to the solenoid drain passage SDR. In addition, the load pressure from the workport 138 is communicated to the pressure compensator valve 146 via load-sense passage 160, as discussed above.

When the spool of the main control valve 702 is shifted to a low-pressure position LPB, fluid flow is returned from the fluid receiving device via the workport 138 and the passage 400 to the counterbalance valve 150 disposed in the return flow path. The fluid pressure in the return flow path acts on the counterbalance valve 150 via the load pressure port 170, which generates at least a portion of the force that activates the counterbalance valve 150 and open the return flow path.

In addition, the pilot pressure is communicated via the pilot passage BP to the pilot port 168 of counterbalance valve 150 to generate an additional force for achieving at least a portion of the pressure setting for opening the return flow path. In the low-pressure position LPB, the pilot passage BP is connected to the metered flow QR. Thus, the pilot pressure communicated to the counterbalance valve 150 is derived from the flow downstream from the pressure compensator valve 146 and upstream from the variable area orifice, as discussed above.

The low-pressure position LPB defines the orifice 602 upstream of the load-sense signal point 604, and defines the orifice 606 downstream of the load-sense signal point 604. The upstream orifice 602 demands a "trigger" amount of fluid flow, such as 0.5 gpm, and the downstream orifice 606 restricts an amount of fluid flow equal to the trigger amount (e.g., 0.5 gpm), to generate sufficient load-sense pressure to open the counterbalance valve 150 so that the workport 138 is connected to tank T across the main control valve 702.

The type of components illustrated in FIGS. 1-6 are examples for illustration only, and other types of components could be used. As an example, rather than using the pressure compensator valve 146 shown in FIGS. 1-7, another pre-pressure compensator with load holding capability, or pre-pressure compensator valve with flow sharing capability could be used.

Further, in the implementations shown in FIGS. 1-7, the respective counterbalance valves 148, 150 can be manually adjusted to achieve a predetermined pressure setting. In some examples, the counterbalance valves 148, 150 may also include an integrated thermal relief valve function from the load port 170 to the inlet port 172, which provides protection from load and/or thermal over pressure. In a thermal over-pressure case, the return pressure at the load port 170 would be the primary force to open the counterbalance valve 148, 150 at the thermal crack setting. Other types of counterbalance valves could be used as described next.

Figure 8A:
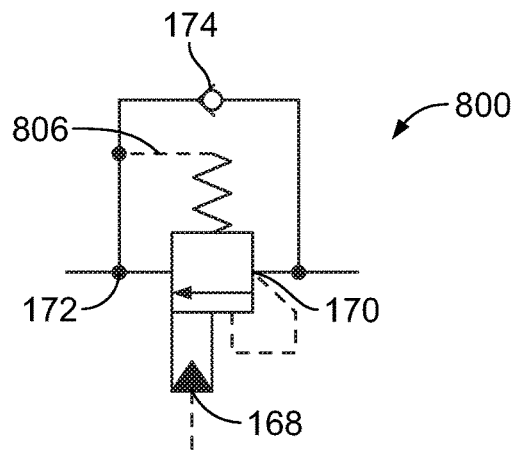
FIG. 8A illustrates a counterbalance valve including a load-sense function for automatically adjusting pressure setting depending on the return flow load pressure, in accordance with an example implementation.
Figure 8B:
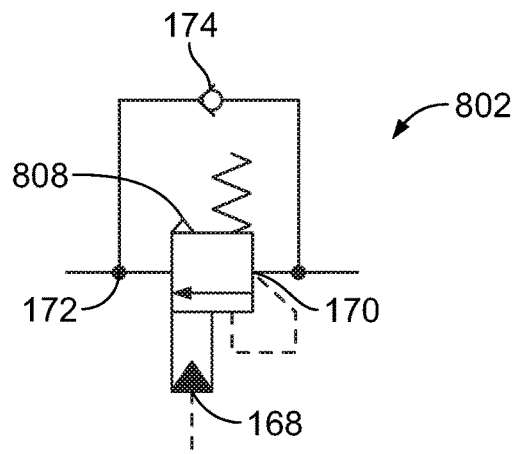
FIG. 8B illustrates an atmospherically referenced three-port counterbalance valve, in accordance with an example implementation.
Figure 8C:
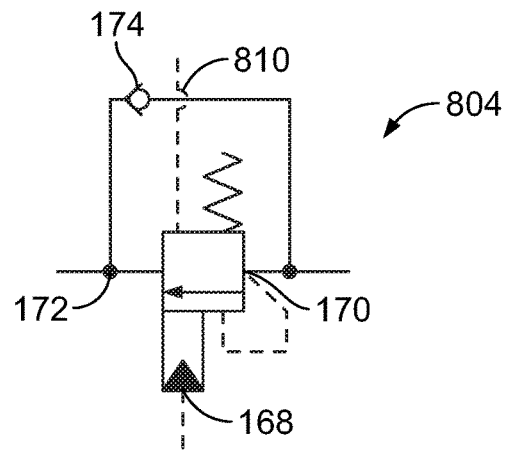
FIG. 8C illustrates counterbalance valve including a hydraulic vent port, in accordance with an example implementation.

FIGS. 8A, 8B, and 8C illustrate other types of counterbalance valves 800, 802, and 804, in accordance with example implementations. The counterbalance valves 800, 802, 804 include similar features compared to the counterbalance valves 148, 150, and therefore the same reference numerals used for the counterbalance valves 148, 150, are used to denote structures corresponding to similar structures in the counterbalance valves 800, 802, and 804.

In addition, the foregoing description of the counterbalance valves 148, 150 is equally applicable to the counterbalance valves 800, 802, 804 except as noted below. It is also understood that the counterbalance valves 148 and/or 150 may be substituted with the counterbalance valves 800, 802, and/or 804 depending on the system requirements.

FIG. 8A illustrates a counterbalance valve 800 including a load-sense function for automatically adjusting pressure setting depending on the return flow load pressure, in accordance with an example implementation. For example, the counterbalance setting may self-adjust up to about 1.3 times the load-induced pressure up to the thermal relief (maximum) setting. In examples, the counterbalance valve 800 might not have an atmospheric vent in the spring chamber, as shown by dashed line 806, such that backpressure at the inlet port 172 may affect the pressure setting.

FIG. 8B illustrates an atmospherically referenced three-port counterbalance valve 802, in accordance with an example implementation. The counterbalance valve 802 may include an atmospheric vent 808 in a spring chamber of the counterbalance valve 802. The atmospheric vent 808 may be configured such that backpressure at the inlet port 172 does not affect the pressure setting.

FIG. 8C illustrates the counterbalance valve 804 including a hydraulic vent port 810, in accordance with an example implementation. The hydraulic vent port 810 may be configured to fluidly connect a spring chamber the counterbalance valve 804 to a tank return line or drain, which may alleviate issues caused by backpressure in the spring chamber.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve section comprising:
   a valve body having (i) a longitudinal bore, (ii) a fluid inlet passage, and (iii) a first workport configured to be fluidly connected to an actuator, and (iv) a second workport configured to be fluidly connected to the actuator;
   a spool axially movable in the longitudinal bore to shift between (i) a neutral position at which the spool is configured to block fluid flow to the first workport, and (ii) a shifted position at which the spool is configured to permit fluid flow thereacross, wherein the valve body further includes a flow path disposed downstream from the spool and configured to fluidly couple the spool to the actuator through the first workport;
   a pressure compensator valve located downstream from the fluid inlet passage and upstream from the spool and configured to regulate fluid flow from the fluid inlet passage to the spool, wherein the valve body further includes a regulated-flow fluid passage disposed downstream of the pressure compensator valve and upstream of the spool and configured to communicate fluid from the pressure compensator valve to the spool; and
   a counterbalance valve disposed in the flow path, wherein the counterbalance valve includes a pilot pressure port, wherein the counterbalance valve is configured to open the flow path in response to a pilot pressure signal received at the pilot pressure port, wherein the valve body further includes a pilot pressure passage configured to communicate fluid to the pilot pressure port, and wherein
   when the spool is in the neutral position, the pilot pressure passage and the pilot pressure port are disconnected from the regulated-flow passage such that the counterbalance valve blocks fluid flow from the first workport, and when the spool is in the shifted position, the spool allows fluid flow from the regulated-flow passage to the second workport, and the pilot pressure passage is connected across the spool to the regulated-flow fluid passage, such that the pilot pressure signal is communicated from, and has pressure level of fluid in, the regulated-flow fluid passage to open the counterbalance valve and allow fluid flow from the first workport through the counterbalance valve.

2. The valve section of claim 1, wherein the counterbalance valve is configured to open the flow path across the counterbalance valve based on a pressure setting,
   wherein fluid pressure in the flow path achieves a portion of the pressure setting for opening the counterbalance valve, and
   wherein the pilot pressure signal at the pilot pressure port generates an additional pressure, such that the fluid pressure in the flow path and the pilot pressure signal cooperate to achieve the pressure setting and open the counterbalance valve.

3. The valve section of claim 1, further comprising:
   a free-flow check valve connected in parallel with the counterbalance valve, the free-flow check valve being configured to allow free flow of fluid passing through the spool to the first workport.

4. The valve section of claim 1, wherein the flow path is a first flow path, the shifted position of the spool is a first shifted position, the counterbalance valve is a first counterbalance valve, the pilot pressure port is a first pilot pressure port, and the pilot pressure passage is a first pilot pressure passage, wherein the second workport is configured for supplying or returning pressurized fluid to or from the actuator via a second flow path, and wherein the valve section further comprises:
   a second counterbalance valve disposed in the second flow path, the second counterbalance valve being configured to open the second flow path in response to a respective pilot pressure signal received at a second pilot pressure port via a second pilot pressure passage when the spool is shifted to a second shifted position and fluid is received from the actuator via the second workport, wherein when the spool is in the second shifted position, the second pilot pressure passage is connected across the spool to the regulated-flow fluid passage, such that the respective pilot pressure signal is communicated from the regulated-flow fluid passage downstream from the pressure compensator valve.

5. The valve section of claim 1, wherein the shifted position is a first shifted position, wherein the valve body further includes a load-sense passage that is connected to the pressure compensator valve, wherein the spool further comprises an internal channel connected to the load-sense passage, and wherein when the spool is shifted to a second shifted position, the spool defines a first fixed orifice upstream from the internal channel, and a second fixed orifice downstream from the internal channel.

6. The valve section of claim 5, wherein when the spool is shifted to the second shifted position:
   the first fixed orifice is configured to permit a trigger amount of fluid to pass therethrough to the internal channel of the spool,
   the second fixed orifice is configured to restrict the trigger amount of fluid received through the internal channel of the spool and generate a load-sense pressure in the internal channel, and
   the load-sense pressure is communicated through the load-sense passage to the pressure compensator valve to generate regulated flow in the regulated-flow fluid passage.

7. The valve section of claim 6, wherein when the spool is shifted to the second shifting position, the pilot pressure passage is connected across the spool to the regulated-flow fluid passage to provide the pilot pressure signal to the counterbalance valve and open the counterbalance valve.

8. A hydraulic valve assembly comprising:
   a valve body having (i) a longitudinal bore, (ii) a fluid inlet passage, (iii) a first workport configured to be fluidly connected to a first side of an actuator, (iv) a first flow path configured to communicate fluid to and from the first side of the actuator through the first workport, (v) a second workport configured to be fluidly connected to a second side of an actuator, and (vi) a second flow path configured to communicate fluid to and from the second side of the actuator through the second workport;
   a spool axially movable in the longitudinal bore to shift between (i) a neutral position at which the spool blocks fluid flow to the first workport and the second workport, (ii) a first shifted position that defines a first variable area orifice configured to meter flow from the fluid inlet passage across the spool through the first flow path to the first workport, and (iii) a second shifted position that defines a second variable area orifice configured to meter flow from the fluid inlet passage across the spool through the second flow path to the second workport;

a pressure compensator valve located downstream from the fluid inlet passage and upstream from the first and second variable area orifices to regulate flow from the fluid inlet passage to the first or second variable area orifice, and wherein the valve body further includes a regulated-flow fluid passage disposed downstream of the pressure compensator valve and upstream of the first and second variable area orifices and configured to communicate fluid from the pressure compensator valve to the first or second variable area orifice;

a first counterbalance valve disposed in the first flow path, wherein the first counterbalance valve includes a first pilot pressure port, wherein the first counterbalance valve is configured to open the first flow path in response to a pilot pressure signal received at the pilot pressure port, wherein the valve body further includes a first pilot pressure passage configured to communicate fluid to the first pilot pressure port; and a second counterbalance valve disposed in the second flow path, wherein the second counterbalance valve includes a second pilot pressure port, wherein the second counterbalance valve is configured to open the second flow path in response to a respective pilot pressure signal received at the second pilot pressure port, wherein the valve body further includes a second pilot pressure passage configured to communicate fluid to the second pilot pressure port, wherein (i) when the spool is in the neutral position, the first and second pilot pressure passages and the first and second pilot pressure ports are disconnected from the regulated-flow passage such that both the first counterbalance valve and the second counterbalance valve block fluid flow from the first workport and the second workport, respectively, (ii) when the spool is in the first shifted position, the first pilot pressure passage is disconnected from the regulated-flow fluid passage and the second pilot pressure passage is connected across the spool to the regulated-flow fluid passage, such that the respective pilot pressure signal is communicated from, and has pressure level of fluid in, the regulated-flow fluid passage and the second counterbalance valve is opened, and (iii) when the spool is in the second shifted position, the second pilot pressure passage is disconnected from the regulated-flow fluid passage and the first pilot pressure passage is connected across the spool to the regulated-flow fluid passage, such that the pilot pressure signal is communicated from the regulated-flow fluid passage and the first counterbalance valve is opened.

9. The hydraulic valve assembly of claim 8, wherein the first counterbalance valve is configured to open the first flow path across the first counterbalance valve based on a pressure setting, wherein fluid pressure in the first flow path achieves a portion of the pressure setting for opening the first counterbalance valve, and wherein the pilot pressure signal at the first pilot pressure port achieves an additional portion of the pressure setting, such that the fluid pressure in the first flow path and the pilot pressure signal cooperate to achieve the pressure setting and open the first counterbalance valve.

10. The hydraulic valve assembly of claim 8, further comprising:

a first free-flow check valve connected in parallel with the first counterbalance valve, the first free-flow check valve being configured to allow free flow of fluid passing through the first variable area orifice to the first workport; and a second free-flow check valve connected in parallel with the second counterbalance valve, the second free-flow check valve being configured to allow free flow of fluid passing through the second variable area orifice to the second workport.

11. The hydraulic valve assembly of claim 8, wherein the valve body further includes a load-sense passage that is connected to the pressure compensator valve, and wherein the spool further comprises an internal channel connected to the load-sense passage, and wherein when the spool is shifted to a third shifted position, the spool defines a first fixed orifice upstream from the internal channel, and a second fixed orifice downstream from the internal channel.

12. The hydraulic valve assembly of claim 11, wherein when the spool is shifted to the third shifted position:

the first fixed orifice is configured to permit a trigger amount of fluid to pass therethrough to the internal channel of the spool, the second fixed orifice is configured to restrict the trigger amount of fluid received through the internal channel of the spool and generate a load-sense pressure in the internal channel, the load-sense pressure is communicated through the load-sense passage to the pressure compensator valve to generate regulated flow in the regulated-flow fluid passage.

13. The hydraulic valve assembly of claim 12, wherein when the spool is shifted to the third shifted position, the first and second pilot pressure passages are connected across the spool to the regulated-flow fluid passage to provide the pilot pressure signal to the first counterbalance valve and the respective pilot pressure signal to the second counterbalance valve to open the first and second counterbalance valves.

14. The hydraulic valve assembly of claim 8, wherein when the spool is in the first shifted position, the spool defines a spool to bore cylindrical area opening configured to meter flow received through the second workport, the second flow path, and across the second counterbalance valve to a reservoir, and when the spool is in the second shifted position, the spool defines a spool to bore cylindrical area opening configured to meter flow received through the first workport, the first flow path, and across the first counterbalance valve to the reservoir.

15. A hydraulic system comprising:

a source of pressurized fluid;

an actuator having a first side and a second side;

a valve body configured to be fluidly coupled to the source and the actuator;

a spool movable in the valve body intermediate the source and the actuator;

a pressure compensator valve disposed upstream from the spool and configured to regulate flow received from the source, wherein the valve body defines (i) a first passage disposed upstream from the spool and configured to fluidly couple the pressure compensator valve to the spool, and (ii) a second passage disposed downstream from the spool and configured to fluidly couple the spool to the second side of the actuator; and a counterbalance valve disposed in the second passage downstream from the spool, wherein when the spool is in a neutral position the counterbalance valve is disconnected from the first passage and is closed to block fluid flow from the second side of the actuator, and wherein when the spool is shifted from the neutral position: (i) the spool allows fluid flow from the first passage to the first side of the actuator, and (ii) the counterbalance valve is opened to permit flow therethrough from the second side of the actuator to the spool in response to a pilot pressure signal communicated from, and having pressure level of fluid in, the first passage.

16. The hydraulic system of claim 15, wherein the counterbalance valve includes a pilot pressure port, wherein the counterbalance valve is opened in response to the pilot pressure signal being communicated to the pilot pressure port, wherein the valve body further includes a third passage configured to communicate fluid to the pilot pressure port, and wherein the third passage is connected to the first passage when the spool is shifted from the neutral position.

17. The hydraulic system of claim 15, wherein the counterbalance valve is opened based on a pressure setting, wherein fluid pressure of flow from the actuator achieves a portion of the pressure setting for opening the counterbalance valve, and wherein the pilot pressure signal communicated from the first passage when the spool is shifted from the neutral position achieves an additional portion of the pressure setting, such that the fluid pressure of the flow from the actuator and the pilot pressure signal cooperate to achieve the pressure setting and open the counterbalance valve.

18. The hydraulic system of claim 15, further comprising:
a free-flow check valve connected in parallel with the counterbalance valve, the free-flow check valve being configured to allow free flow to the actuator.

19. The hydraulic system of claim 15, wherein the valve body further includes a load-sense passage that is connected to the pressure compensator valve, and wherein the spool further comprises an internal channel connected to the load-sense passage, and wherein when the spool is shifted to a float position, the spool defines a first fixed orifice upstream from the internal channel, and a second fixed orifice downstream from the internal channel.

20. The hydraulic system of claim 19, wherein when the spool is shifted to a particular shifted position:
the first fixed orifice permits a trigger amount of fluid to pass therethrough to the internal channel of the spool,
the second fixed orifice restricts the trigger amount of fluid received through the internal channel of the spool and generates a load-sense pressure in the internal channel,
the load-sense pressure is communicated through the load-sense passage to the pressure compensator valve to generate regulated flow in the regulated-flow fluid passage, and
the pilot pressure passage is connected across the spool to the regulated-flow fluid passage to provide the pilot pressure signal to the counterbalance valve and open the counterbalance valve.

* * * * *